(12) United States Patent
Sprague (10) Patent No.: US 10,176,342 B2
(45) Date of Patent: Jan. 8, 2019

(54) PROTECTING MEMORY STORAGE CONTENT

(71) Applicant: HEWLETT PACKARD ENTERPRISE DEVELOPMENT LP, Houston, TX (US)

(72) Inventor: Fred A. Sprague, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 97 days.

(21) Appl. No.: 15/315,999

(22) PCT Filed: Jul. 31, 2014

(86) PCT No.: PCT/US2014/049105
§ 371 (c)(1),
(2) Date: Dec. 2, 2016

(87) PCT Pub. No.: WO2016/018354
PCT Pub. Date: Feb. 4, 2016

(65) Prior Publication Data
US 2018/0144157 A1 May 24, 2018

(51) Int. Cl.
*G06F 11/30* (2006.01)
*G06F 21/62* (2013.01)
*G06F 3/06* (2006.01)
*G06F 9/54* (2006.01)
*G06F 21/60* (2013.01)
*G06F 12/1027* (2016.01)

(52) U.S. Cl.
CPC ........ *G06F 21/6281* (2013.01); *G06F 3/0622* (2013.01); *G06F 3/0623* (2013.01); *G06F 9/545* (2013.01); *G06F 21/602* (2013.01); *G06F 12/1027* (2013.01)

(58) Field of Classification Search
CPC ... G06F 21/6218; G06F 21/57; G06F 21/6236
USPC ........................................................ 713/193
See application file for complete search history.

(56) References Cited

U.S. PATENT DOCUMENTS

| 6,212,610 B1 | 4/2001 | Weber et al. |
| 7,272,832 B2 | 9/2007 | Gardner |

(Continued)

FOREIGN PATENT DOCUMENTS

| JP | 2009278491 | 11/2009 |
| JP | 2012234580 | 11/2012 |

OTHER PUBLICATIONS

International Searching Authority, The International Search Report and the Written Opinion, dated Apr. 13, 2015, 12 Pages.

(Continued)

*Primary Examiner* — Samson B Lemma
(74) *Attorney, Agent, or Firm* — Sheppard Mullin Richter & Hampton LLP (57) ABSTRACT

An apparatus includes memory storage and a protection system to protect content of the memory storage. The protection system includes a first key that is held by a process and is associated with application data to be stored in the memory storage; and a second key that is held by an operating system kernel. The protection system also includes a cryptography engine to perform a cryptography function on the data based at least in part on the first and second keys.

14 Claims, 6 Drawing Sheets

(56) References Cited

U.S. PATENT DOCUMENTS

| | | |
|---|---|---|
| 8,006,055 B2 | 8/2011 | Waters et al. |
| 2008/0015995 A1 | 1/2008 | Chen |
| 2010/0153749 A1* | 6/2010 | Sakai .................. G06F 21/6236 713/193 |
| 2010/0217977 A1 | 8/2010 | Goodwill et al. |
| 2010/0299534 A1* | 11/2010 | Shim .................. G06F 21/6218 713/189 |
| 2012/0093319 A1* | 4/2012 | Saito ................ G11B 20/00086 380/278 |
| 2013/0173930 A1 | 7/2013 | Obligacion |

OTHER PUBLICATIONS

Moraru, I. et al., Persistent, Protected and Cached: Building Blocks for Main Memory Data Stores, (Research Paper), Dec. 2011, 24 Pages.

* cited by examiner

PROTECTING MEMORY STORAGE CONTENT

BACKGROUND

A computer system has traditionally contained both volatile and non-volatile storage devices. In this manner, due to their relatively faster access times, volatile memory devices, such as dynamic random access memory (DRAM) devices, have traditionally been used to form the working memory for the computer system. To preserve computer system data when the system is powered off, data has traditionally been stored in non-volatile mass storage devices associated with slower access times, such as magnetic media-based or optical media-based mass storage devices.

The development of relatively high density, solid state non-volatile memory technologies with relatively fast access times is closing the gap between the two technologies; and as a result, non-volatile memory devices are becoming increasingly used to form a working, persistent memory for both traditional "memory" and "storage" functions.

DETAILED DESCRIPTION

Data stored in a persistent memory is "permanent" in nature, and as such, the content of a persistent memory is particularly susceptible to accidental and intentional accesses. The persistent memory may be the memory of a portable computer system; potentially removable media from an electronic device, such as a non-volatile, subscriber information module (SIM) card of a cellular phone or smartphone; a persistent memory storing sensitive information for an enterprise; a persistent memory storing data for a datacenter; and so forth.

In accordance with systems and techniques that are disclosed herein, the content of a memory storage system is protected using a cryptology-based protection system that use both an operating system kernel-held cryptography key and a process-held cryptography key for purposes of encrypting data to be stored in a protected memory storage system and decrypting data retrieved from the memory storage system. This protection inhibits man-in-the middle attacks, as sniffers in-line between the memory storage system and the core/process using the memory content are unable to examine the actual memory content. Also, content acquired from accidental and intentional unauthorized accesses are not easily decoded. Moreover, in accordance with example implementations, a relatively inexpensive cipher (from the standpoint of processing power and/or processing time) may be used.

Figure 1:
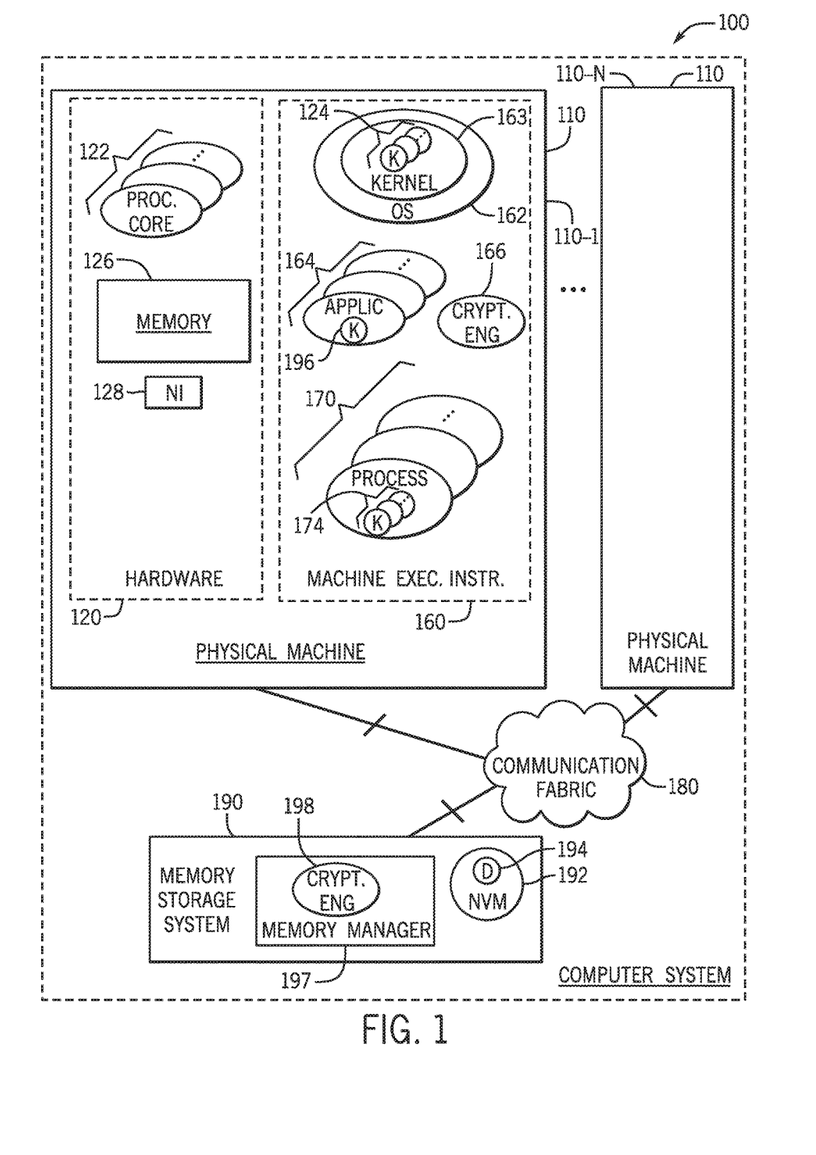
FIG. 1 is a schematic diagram of a computer system according to an example implementation.

As a more specific example, FIG. 1 depicts an example computer system 100 that includes at least one physical machine 110 (example physical machines 110-1 to 110-N, being depicted in FIG. 1) and a memory storage system 190 (a persistent memory storage system, for example) that is accessed by the physical machine(s) 110 for purposes of storing data in the system 190 and retrieving data from the system 190. The computer system 100 may be any of a number of different systems, such as a desktop computer, a tablet, a portable computer, a cellular telephone, a local area network, a wide area network, a datacenter, a client, a server, and so forth. The computer system 100 may be located in a single box or rack or may be distributed across several boxes or racks. Moreover, the components of the computer system 100 may be disposed at a single geographic location or may be distributed over multiple locations. Thus, many implementations of the computer system 100 are contemplated and are within the scope of the appended claims.

The physical machine 110, in general, is an actual machine that is made up of actual hardware 120 and is configured to operate in the example implementations that are disclosed herein by executing actual machine executable instructions 160, or "software." As examples, the physical machine 110 may be a microprocessor board, an embedded microcontroller board, a server blade, a CPU, a standalone computer; a portable computer, a tablet, a server, a client and so forth.

The physical machine(s) 110 of the computer system 100 access the memory storage system 190 using communication fabric 180. Depending on the particular implementation of the computer system 100, the communication fabric 180 may be single bus, multiple buses, a hierarchically-arranged bus architecture, or may be network fabric, as examples. For example implementations in which the communication fabric 180 is a network fabric, the network fabric may include one or more buses or fast interconnects. The network 40 may include wide area network (WAN) connections, local area network (LAN) connections, wireless connections, Internet connections, and so forth, depending on the particular implementation.

The memory storage system 190, in accordance with example implementations, may be a persistent memory storage system that has non-volatile memory 192 that stores data 194, i.e., the memory content that is protected using the systems and techniques that are disclosed herein. The non-volatile memory 192 may be formed from an of a number of non-volatile devices, such as memristor memory devices, phase change memory devices, flash memory devices, and so forth.

In accordance with example implementations, the memory content protection system includes at least the following components of the physical machine 110: a process-held key, an operating system kernel-held key and a cryptography function on data stored in and referenced from memory storage based at least in part on the process-held and kernel-held keys.

More specifically, in accordance with example implementations, the data 194 stored in the memory storage system 190 is encrypted using three levels of encryption. In this manner, for purposes of providing the three levels of encryption, three different cryptography keys are used: a first key 196 that is held by an application 164 (for example) that requests retrieval or storage of the data 194; a second key 124 that is held by an operating system kernel 163; and a third 174 key that is held by a process that forms an instance of the application 164. A cryptography engine 198 of the memory storage system 190 (an engine built into a memory controller, or memory manager 197, of the storage system 190, for example) decrypts and encrypts content retrieved from and stored in the memory storage system 190 using the application-held key 196. A cryptographic engine 166 (a software or hardware cryptography engine, depending on the example implementation) of the physical machine 110 further decrypts content retrieved from the memory storage system 190 using the kernel-held 124 and process-held 174 keys; and conversely, the cryptographic engine 166 encrypts content to be stored in the memory storage system 190 using the kernel-held 124 and process-held keys 174.

As a more specific example, in accordance with example implementations, the data 194 may contain a file that is to be requested by a given application 164 that is executing on the physical machine 110-1. In requesting the file from the memory storage system 190, the application 164 provides a key 196 to the system 190. For example, the application 164 may generate a write request, which includes the key 196 as a parameter of the request. The key 196 may be uniquely associated with the file, with the application, or with the entire memory storage system (as examples), depending on the particular implementation.

Continuing the example, before the memory storage system 190 provides data to the communication fabric 180 in response to the request, the cryptography engine 198 of the memory storage system 190 first applies the key 196 to the data 194 (based on a predetermined cipher, as described herein) to produce data, which is decrypted at a first level. The memory storage system 190 then communicates this first level, decrypted data via the communication fabric 180 to the physical machine 110-1 on which the application 164 executes. For example, a network interface 128 of the physical machine 110-1 may receive the first level, decrypted data and store the data in a buffer in a memory 126 of the physical machine 110-1. The data at this point, however, is still encrypted by a kernel-held key 124 and by a process-held key 174.

The kernel 163 of operating system 162, which is the core of the operating system 162, selects the appropriate key 124 (from a larger pool of candidate keys 124) to be used in further decrypting the data based on the processor that is executing the application 164 that requested the data. In accordance with example implementations, the kernel 163 selects the key 124. For example, in accordance with example implementations, the kernel-held keys 124 are associated with different processor core identities, such that the kernel 163 selects a given key 124 for a given application 164 based the specific processor core 122 that is executing the given application 164.

Moreover, in accordance with example implementations, the process 170, which is the instance of the application 164 requesting the data, selects the appropriate key 174 (which is also used in further decrypting the data) from a larger pool of candidate keys 174. In this manner, in accordance with example implementations, the process 170 selects the key 174 based on the memory region that is currently being accessed by the process 170, as a certain memory region is commensurate with a certain function or subroutine of the application 164, which is processing the requested data. More specifically, in accordance with example implementations, the keys 174 are associated with different translation lookaside buffers (TLBs), which define sets of cached virtual-to-physical address conversions for different memory regions. Although the TLBs may not be accessible (or even known) to the process 170, the process 170 is the entity that sets up the connections (for files, input/output (I/O), and so forth); and as such, the process 170 selects the appropriate key 174 and sets the key 174 in place based on the connection being made. It is noted that when moving a process from one processing core 122 to another (or possibly to a different processing package altogether), the TLB entries may be moved as well, so that the move may be made relatively seamlessly.

The cryptography engine 166 of the physical machine 110-1, for this example, receives the selected kernel-held 124 and process-held 174 keys and applies these keys to the first level, decrypted data received from the memory subsystem 190 to further decrypt the data to generate the final, decrypted data that may then be used by the requesting application 164.

In accordance with example implementations, the cryptography engine 166 may be formed by a central processing unit, or processor (such as one of the processor cores 122 or another processor), which executes a set of machine executable instructions. In further example implementations, the cryptography engine 166 may be formed by an application specific integrated circuit (ASIC). Moreover, for example implementations in which the cryptography engine 166 is formed from the execution of machine executable instructions, the engine 166 may be formed from two decryption engine layers, with each layer decrypting data based on a different one of the keys 124 and 174. Thus, many implementations are contemplated, which are within the scope of the claims.

Figure 2:
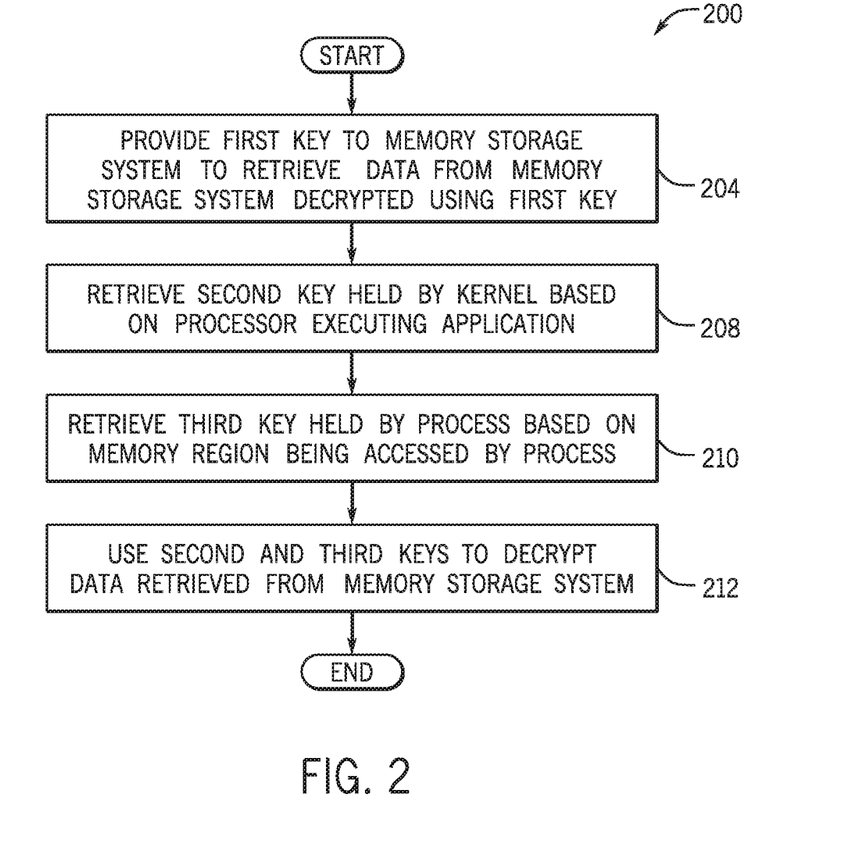
FIG. 2 is a flow diagram depicting a technique to decrypt data retrieved from a memory storage system according to an example implementation.

Thus, referring to FIG. 2 in conjunction with FIG. 1, in accordance with example implementations, a technique 200 to protect memory content includes providing (block 204) a first key to a memory storage system to retrieve data from the memory storage system, which is decrypted using the first key. The technique 200 includes retrieving (block 208) a second key that is held by a kernel based on the processor that is executing the application and retrieving (block 210) a third key that is held by a process based on a memory region that is being accessed by the process. The second and third keys are used to further decrypt the data retrieved from the memory storage system, pursuant to block 208.

Referring back to FIG. 1, in accordance with example implementations, the processing cores 122, which may be CPU packages, processing cores on one or multiple CPU packages, and so forth (depending on the implementation) are examples of the hardware 120. Moreover, the hardware 120 may include additional components, such as the memory 126 (memory used by the processing cores 122, for example) and the network interface 128. The memory 126 may store machine executable instructions (such as instructions 160, for example), data and so forth.

The memory 126 is a non-transitory storage medium and may include one or more of the following: semiconductor storage devices, memristor-based storage devices; magnetic storage devices; phase charge memory-based devices, optical storage devices, flash memory devices, optical storage devices, volatile memory devices, non-volatile memory device, and so forth. The machine executable instructions 160 contain sets of instructions associated with the applications 164, processes 170, operating system 162, cryptography engine 166 and so forth.

As noted above, the computer system 100 may be formed from one or multiple physical machines 110. If the computer system 100 includes multiple physical machines 110, the other physical machine(s) 110 may or may not have an architecture and/or components similar to what is illustrated for the physical machine 110-1, depending on the particular implementation.

Figure 3A:
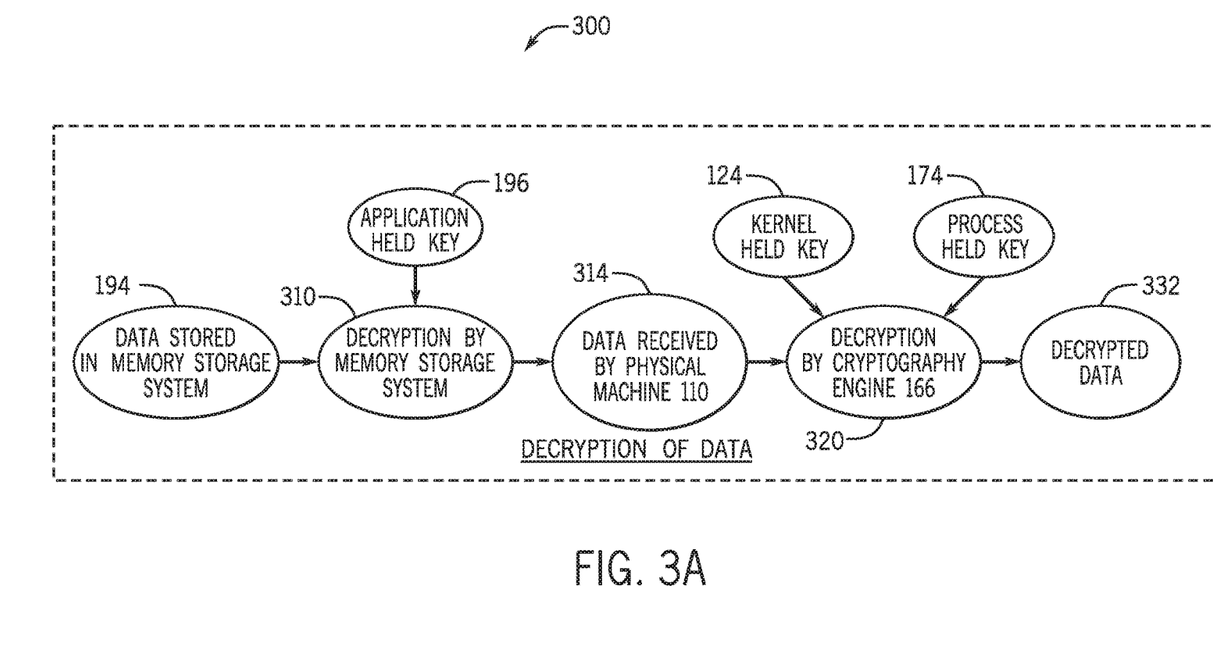
FIG. 3A is an illustration of a process to decrypt data retrieved from a memory storage system according to an example implementation.

FIG. 3A depicts a decryption process 300, in accordance with example implementations. Referring to FIG. 3A in conjunction with FIG. 1, the encryption process 300 begins by processing data 194 that is stored in the memory storage system 190. This data is decrypted 310 by the memory storage system using the application-held key 196 to produce data 314 that is received by the physical machine 110. The data 314 is then decrypted 320 by the cryptography engine 166 using a kernel-held key 124 and a process held key 174 to produce decrypted data 332.

Figure 3B:
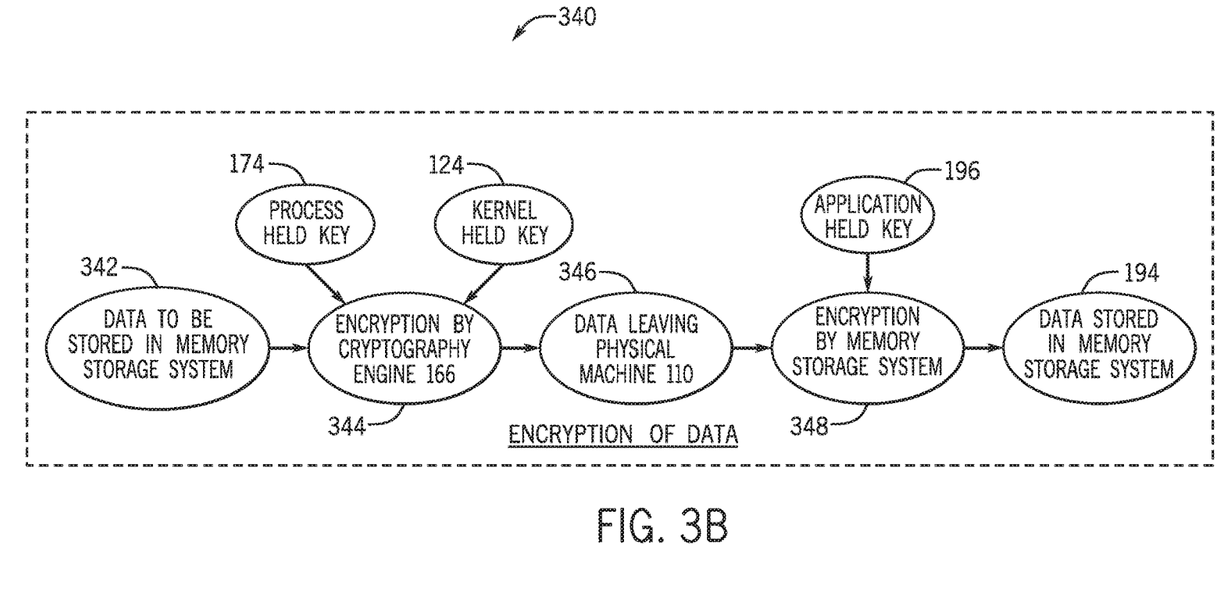
FIG. 3B is an illustration of a process to encrypt data stored in a memory storage system according to an example implementation.

Referring back to FIG. 1, in addition to retrieving data from the memory storage system 190, an application 164 may desire to store data originating with the application 164 and as such, may initiate a sequence of actions to store data in the memory storage system 190. For this to occur, the data may be encrypted in a sequence, similar to an example encryption process 340 that is depicted in FIG. 3B. Referring to FIG. 3B in conjunction with FIG. 1, data 342 that is to be stored, or written, to the memory storage system 190 is encrypted 344 by the cryptography engine 166 using the process-held 174 and kernel-held 124 keys to generate encrypted data 346 that leaves the physical machine 110 and is communicated over the communication fabric 180 to the memory storage system 190. In the memory storage system 190, the system 190 further encrypts 348 the data (via the cryptography engine 198) to produce data 194 stored in the memory storage system 190.

Figure 4:
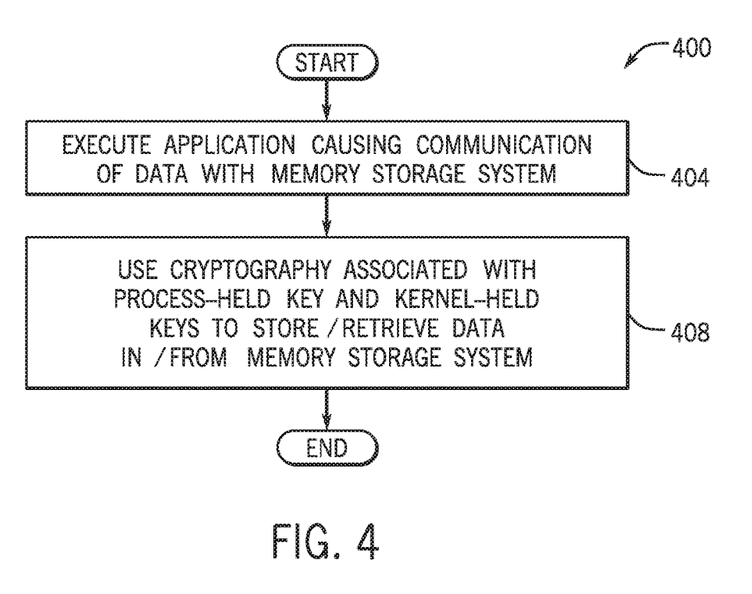
FIG. 4 is a flow diagram depicting a cryptography-based technique to store data in and retrieve data from a memory storage system according to an example implementation.

Referring to FIG. 4, to summarize, in accordance with example implementations, a technique 400 to protect memory storage content includes executing (block 404) an application to cause the communication of data with a memory storage system. Pursuant to the technique 400, cryptography that is associated with at least process and kernel held keys is used (block 408) to store and/or retrieve the data in the memory storage system.

Figure 5:
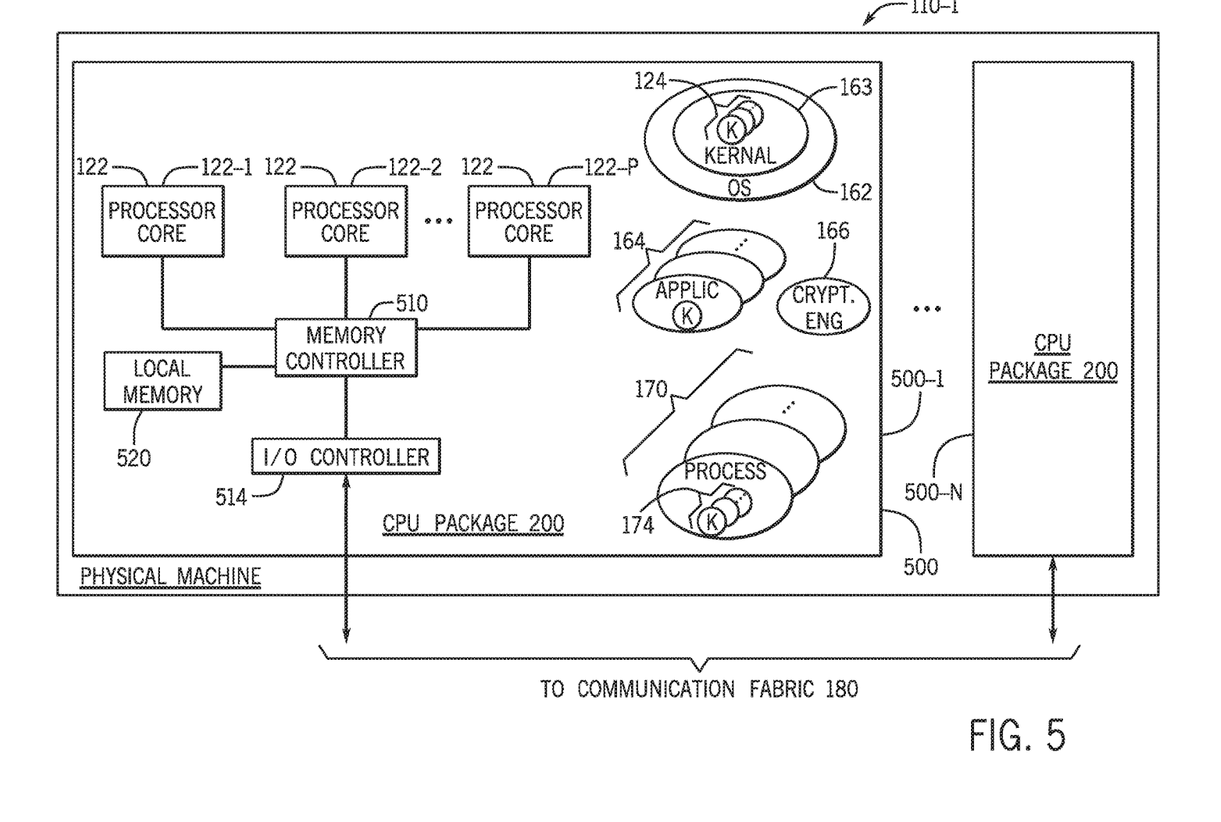
FIG. 5 is a more detailed schematic diagram of a physical machine of FIG. 1 according to an example implementation.

Referring to FIG. 5, as a more specific example of the physical machine 110, in accordance with some implementations, a given physical machine 110 (such as depicted machine 110-1) may include multiple CPU packages 500 (M CPU packages 500-1 . . . 500-M, being depicted in FIG. 5). In this regard, each CPU package 500 is a physical semiconductor package that may contain multiple processor cores 122 (P processor cores 122-1, 122-2 . . . 122-P, being depicted in FIG. 5). In accordance with an example implementation, the processor cores 122 may be arranged in a non-uniform memory access (NUMA) architecture, in which the processor cores 122 on a given CPU package 500 share a local memory 520. In this regard, access to the local memory 520 may be controlled by a memory controller 510 of the CPU package 500. Moreover, in accordance with example implementations, the memory controller 510 may decrypt and encrypt the data provided to and from a given processor core 122 via a key 124 that is associated with the core 122. The processor cores 122 may access memory outside of the CPU package 500, such as the remotely-disposed memory storage system, using an I/O controller 514.

The physical machine 110 may have an architecture other than a NUMA architecture or, in a general, may have an architecture that is different from the architecture that is depicted in FIG. 5, in accordance with further implementations.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method, comprising;
    protecting content of a memory storage subsystem, comprising:
        accessing first data being stored by the memory storage system and being protected through encryption, the accessing comprising using the memory storage system to decrypt the first data based at least in part on a first key to provide second data representing the decrypted first data;
        providing a second key held by a process associated with an application;
        providing a third key held by an operating system kernel; and
        decrypting the second data based at least in part on the second and third keys to provide data for use by the application.

2. The method of claim 1, wherein providing the third key comprises selecting the third key from a plurality of candidate keys based at least in part on a processor on which the application executes.

3. The method of claim 1, wherein providing the first key comprises providing a key associated with at least one of a file, the application and the memory subsystem.

4. The method of claim 1, wherein providing the second key comprises selecting the second key from a plurality of candidate keys based at least in part on a memory region being accessed due to execution of the application.

5. The method of claim 4, wherein providing the second key comprises:
    selecting the second key based at least in part on a translation lookaside buffer (TLB) being used in the access.

6. The method of claim 1, further comprising:
    Using the memory storage system to encrypt data to be stored in the memory storage system.

7. The method of claim 1, wherein the memory storage system comprises persistent memory storage.

8. An article comprising a non-transitory computer readable storage medium to store instructions that when executed by a computer cause the computer to:
    Through execution of an application, cause data to be communicated with memory storage system; and
    Protect access to content of the memory storage subsystem, comprising using cryptology associated with at least a process-held key and an operating system kernel-held key to be applied to perform at least one of encrypting the data for storage in the memory storage system and decrypting the data for retrieval from the memory storage system, and using a cryptology associated with an application-held key to be applied to data resulting from the cryptology associated with at least the process-held key and an operating system kernel-held key to perform at least one of encrypting said data resulting from the cryptology associated with at least the process-held key and an operating system kernel-held key and decrypting said data resulting from the cryptology associated with at least the process-held key and an operating system kernel-held key.

9. The article of claim 8, the storage medium storing instructions that when executed by the computer cause the computer to cause a process associated with the application to provide the process-held key based at least in part on a memory region being accessed by the process.

10. The article of claim 8, the storage medium storing instructions that when executed by the computer cause the computer to cause an operating system kernel to provide the kernel-held key based at least in part on a processor associated with execution of the application.

11. The article of claim 8, wherein the memory storage system comprises persistent memory storage.

12. An apparatus comprising:
   memory storage; and
   a protection system to protect content of the memory storage, the protection system comprising:
      a first key held by a process and associated with application data to be stored in the memory storage;
      a second key held by an operating system kernel;
      a cryptography engine to perform a cryptography function on the data based at least in part on the first and second keys;
      a third key held by an application; and
      wherein the data, when stored in the memory storage system, is further encrypted by the third key used by the memory storage to decrypt the data before communicating the decrypted data outside of the memory storage.

13. The apparatus of claim 12, wherein the first key is associated with at least one of a file, the application and the memory storage.

14. The apparatus of claim 12, further comprising communication fabric over which the data is communicated to and from the memory storage, and the cryptographic engine further selectively encrypts and decrypts the communicated data based on the first and second keys.

* * * * *